(12) United States Patent
Rich

(10) Patent No.: US 6,283,288 B1
(45) Date of Patent: Sep. 4, 2001

(54) FISHING POLE AND TACKLE CASE

(76) Inventor: Paul Rich, 13 Emmet St., Brockton, MA (US) 02402

( * ) Notice: Subject to any disclaimer, the term of this patent is extended or adjusted under 35 U.S.C. 154(b) by 0 days.

(21) Appl. No.: 09/426,158

(22) Filed: Oct. 22, 1999

(51) Int. Cl.[7] .................................................. B65D 85/00
(52) U.S. Cl. .................... 206/315.11; 206/373; 206/523; 43/54.1; 220/524
(58) Field of Search ............................... 206/315.11, 475, 206/373, 523, 317, 579; 43/26, 54.1, 57.1; 220/523, 524; 224/922

(56) References Cited

U.S. PATENT DOCUMENTS

| | | | | |
|---|---|---|---|---|
| 424,603 | * | 4/1890 | Favor ................................ | 206/315.11 |
| 2,501,270 | * | 3/1950 | Fleming ........................... | 206/315.11 |
| 2,948,080 | * | 8/1960 | Hawley ............................ | 206/315.11 |
| 3,148,811 | * | 9/1964 | Foliz ..................................... | 43/57.1 |
| 4,170,801 | * | 10/1979 | Ward ........................................ | 43/26 |
| 4,829,699 | * | 5/1989 | Perkins .................................. | 43/57.1 |
| 5,228,232 | * | 7/1993 | Miles ..................................... | 43/57.1 |
| 5,319,874 | * | 6/1994 | Vance .............................. | 206/315.11 |
| 5,347,746 | * | 9/1994 | Letson .................................. | 43/57.1 |
| 5,505,354 | * | 4/1996 | Hutton et al. ........................ | 224/196 |
| 5,526,927 | * | 6/1996 | McLemore ..................... | 206/315.11 |
| 5,678,686 | * | 10/1997 | Hagemann et al. ............ | 206/315.11 |
| 5,960,950 | * | 10/1999 | Meeker et al. ................... | 206/315.11 |

\* cited by examiner

*Primary Examiner*—Paul T. Sewell
*Assistant Examiner*—Shian Luong

(57) ABSTRACT

A fishing pole and tackle case for storing and transporting fishing rods and fishing tackle. The fishing pole and tackle case includes a rod case adapted for protecting the fishing rod therein. An upper periphery wall extends downward from a peripheral edge of the top surface such that an inner surface of the upper periphery wall defines an interior space of the rod case. A plurality of rod securing means are coupled to an interior face of the rod case. The rod securing means are adapted for securing the rod to the rod case. A tackle container is adapted for holding the fishing tackle therein. The tackle container has a bottom wall and a lower peripheral wall. The lower peripheral wall extends upward from a periphery of the bottom wall. The bottom wall and the lower peripheral wall are for defining a storage space of the tackle container. A plurality of clasping means are for securing the rod case to the tackle container. The rod case is hingably coupled to a rear wall of the lower peripheral wall of the tackle container. A tackle container cover is rotatably coupled to an interior surface of the rear wall of the lower peripheral wall. The tackle container cover is adapted for keeping the fishing tackle within the tackle container.

11 Claims, 3 Drawing Sheets

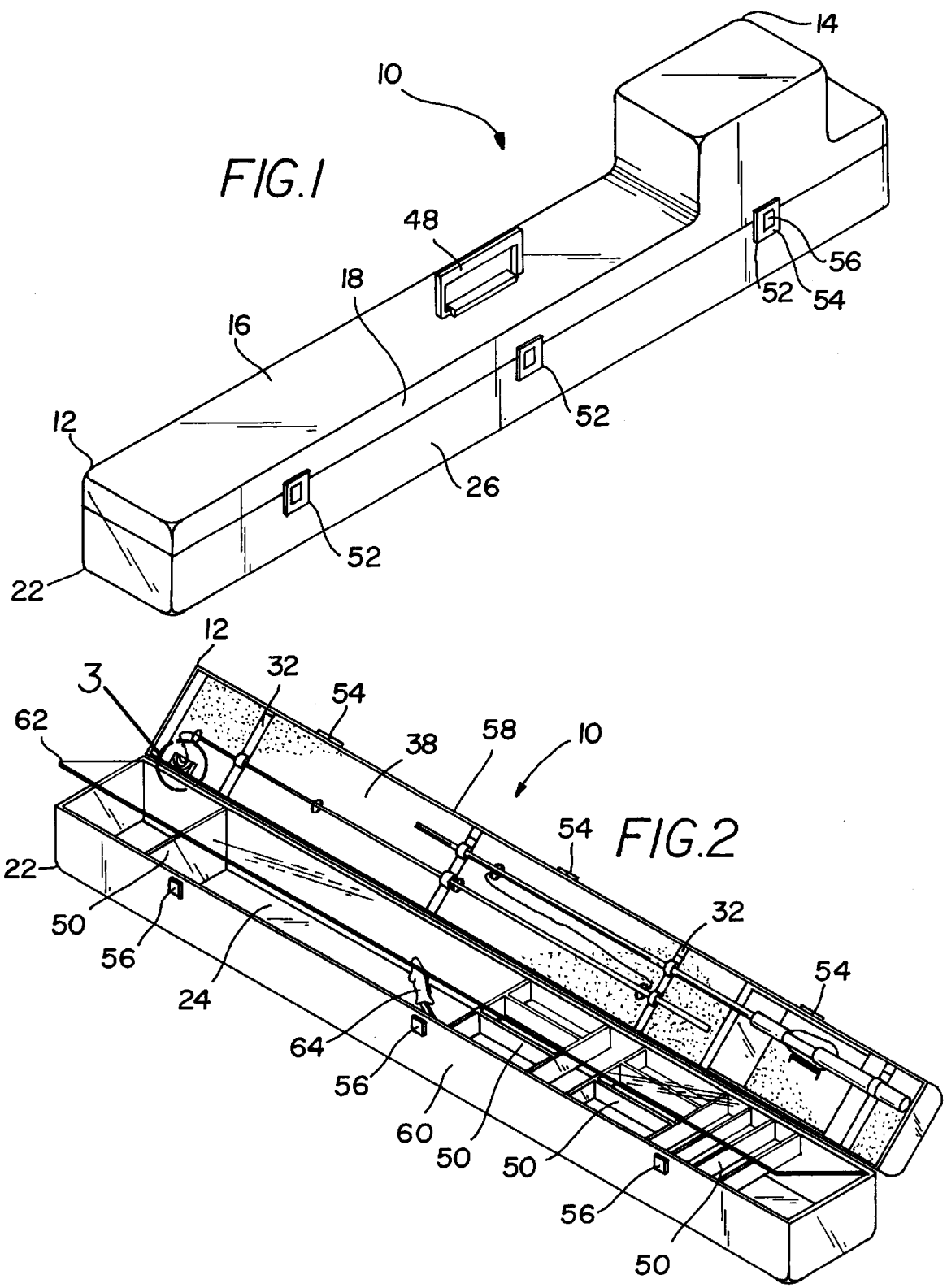

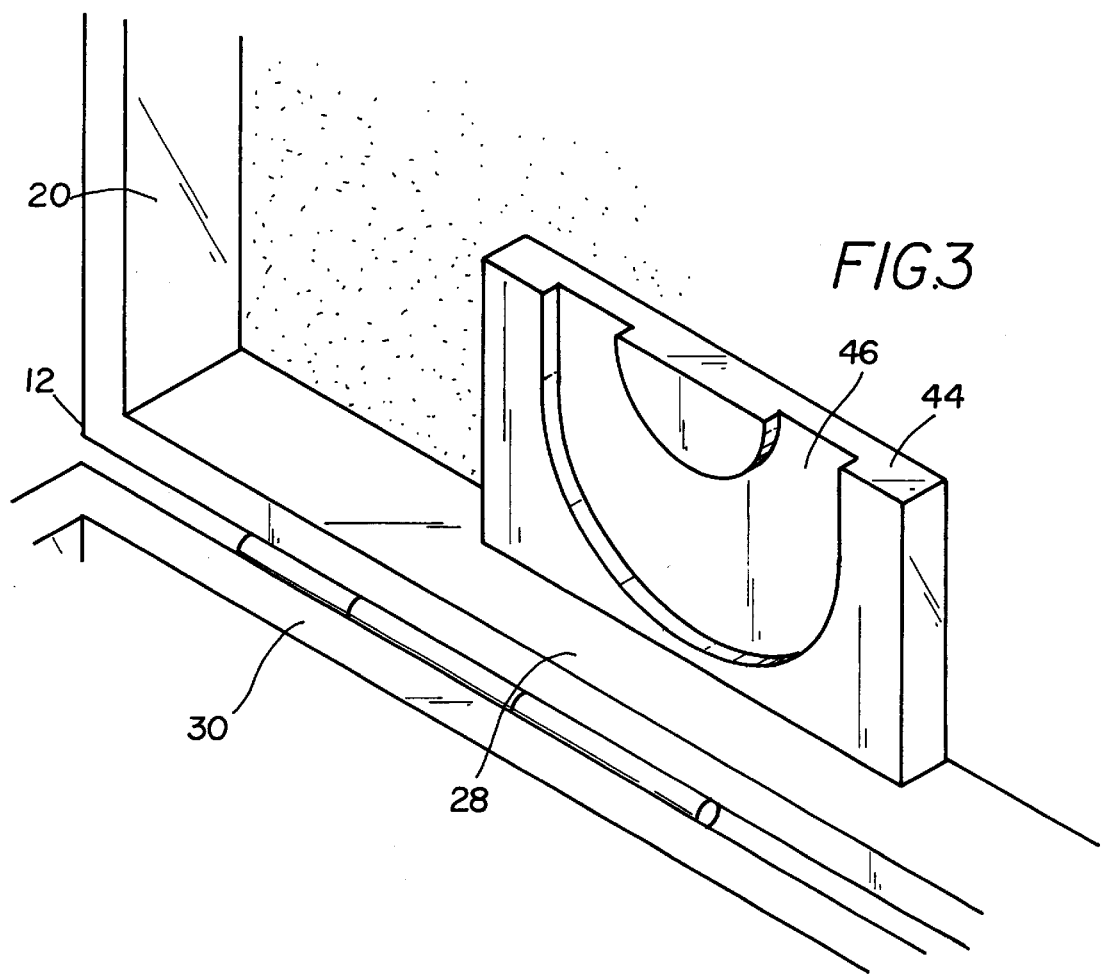
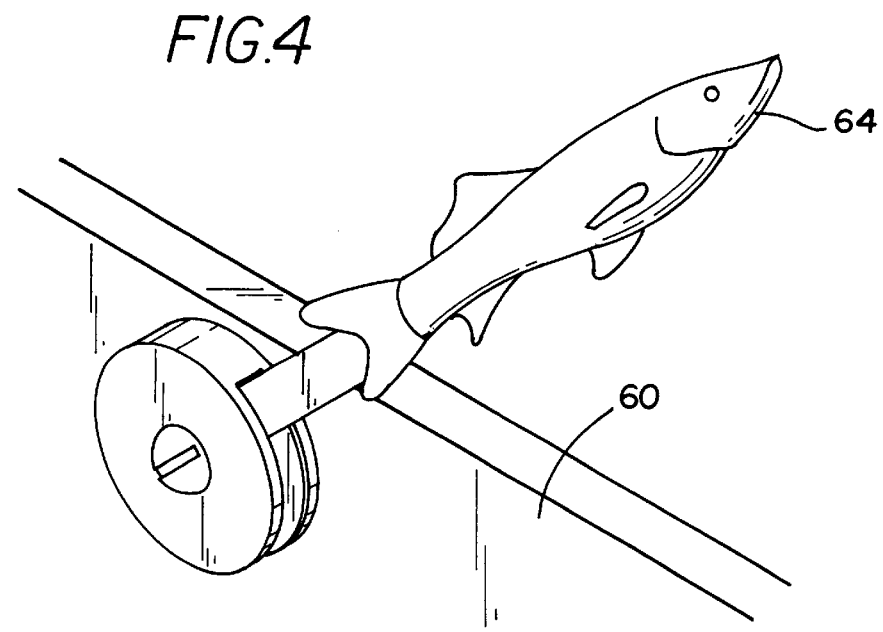

FISHING POLE AND TACKLE CASE

BACKGROUND OF THE INVENTION

1. Field of the Invention

The present invention relates to fishing tackle and rod boxes and more particularly pertains to a new fishing pole and tackle case for storing and transporting fishing rods and fishing tackle.

2. Description of the Prior Art

The use of fishing tackle and rod boxes is known in the prior art. More specifically, fishing tackle and rod boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,348,329; U.S. Pat. No. 5,547,079; U.S. Pat. No. Des. 318,371; U.S. Pat. No. 5,319,874; U.S. Pat. No. 3,802,113; and U.S. Pat. No. 2,097,185.

While these devices fulfill their respective, particular objectives and requirements, the aforementioned patents do not disclose a new fishing pole and tackle case. The inventive device includes a rod case adapted for protecting the fishing rod therein. An upper periphery wall extends downward from a peripheral edge of the top surface such that an inner surface of the upper periphery wall defines an interior space of the rod case. A plurality of rod securing means are coupled to an interior face of the rod case. The rod securing means are adapted for securing the rod to the rod case. A tackle container is adapted for holding the fishing tackle therein. The tackle container has a bottom wall and a lower peripheral wall. The lower peripheral wall extends upward from a periphery of the bottom wall. The bottom wall and the lower peripheral wall are for defining a storage space of the tackle container. A plurality of clasping means are for securing the rod case to the tackle container. The rod case is hingably coupled to a rear wall of the lower peripheral wall of the tackle container. A tackle container cover is rotatably coupled to an interior surface of the rear wall of the lower peripheral wall. The tackle container cover is adapted for keeping the fishing tackle within the tackle container.

In these respects, the fishing pole and tackle case according to the present invention substantially departs from the conventional concepts and designs of the prior art, and in so doing provides an apparatus primarily developed for the purpose of storing and transporting fishing rods and fishing tackle.

SUMMARY OF THE INVENTION

In view of the foregoing disadvantages inherent in the known types of fishing tackle and rod boxes now present in the prior art, the present invention provides a new fishing pole and tackle case construction wherein the same can be utilized for storing and transporting fishing rods and fishing tackle.

The general purpose of the present invention, which will be described subsequently in greater detail, is to provide a new fishing pole and tackle case apparatus and method which has many of the advantages of the fishing tackle and rod boxes mentioned heretofore and many novel features that result in a new fishing pole and tackle case which is not anticipated, rendered obvious, suggested, or even implied by any of the prior art fishing tackle and rod boxes, either alone or in any combination thereof.

To attain this, the present invention generally comprises a rod case adapted for protecting the fishing rod therein. An upper periphery wall extends downward from a peripheral edge of the top surface such that an inner surface of the upper periphery wall defines an interior space of the rod case. A plurality of rod securing means are coupled to an interior face of the rod case. The rod securing means are adapted for securing the rod to the rod case. A tackle container is adapted for holding the fishing tackle therein. The tackle container has a bottom wall and a lower peripheral wall. The lower peripheral wall extends upward from a periphery of the bottom wall. The bottom wall and the lower peripheral wall are for defining a storage space of the tackle container. A plurality of clasping means are for securing the rod case to the tackle container. The rod case is hingably coupled to a rear wall of the lower peripheral wall of the tackle container. A tackle container cover is rotatably coupled to an interior surface of the rear wall of the lower peripheral wall. The tackle container cover is adapted for keeping the fishing tackle within the tackle container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing pole and tackle case apparatus and method which has many of the advantages of the fishing tackle and rod boxes mentioned heretofore and many novel features that result in a new fishing pole and tackle case which is not anticipated, rendered obvious, suggested, or even implied by any of the prior art fishing tackle and rod boxes, either alone or in any combination thereof.

It is another object of the present invention to provide a new fishing pole and tackle case which may be easily and efficiently manufactured and marketed.

It is a further object of the present invention to provide a new fishing pole and tackle case which is of a durable and reliable construction.

An even further object of the present invention is to provide a new fishing pole and tackle case which is susceptible of a low cost of manufacture with regard to both materials and labor, and which accordingly is then susceptible of low prices of sale to the consuming public, thereby making such fishing pole and tackle case economically available to the buying public.

Still yet another object of the present invention is to provide a new fishing pole and tackle case which provides in the apparatuses and methods of the prior art some of the advantages thereof, while simultaneously overcoming some of the disadvantages normally associated therewith.

Still another object of the present invention is to provide a new fishing pole and tackle case for storing and transporting fishing rods and fishing tackle.

Yet another object of the present invention is to provide a new fishing pole and tackle case which includes a rod case adapted for protecting the fishing rod therein. An upper periphery wall extends downward from a peripheral edge of the top surface such that an inner surface of the upper periphery wall defines an interior space of the rod case. A plurality of rod securing means are coupled to an interior face of the rod case. The rod securing means are adapted for securing the rod to the rod case. A tackle container is adapted for holding the fishing tackle therein. The tackle container has a bottom wall and a lower peripheral wall. The lower peripheral wall extends upward from a periphery of the bottom wall. The bottom wall and the lower peripheral wall are for defining a storage space of the tackle container. A plurality of clasping means are for securing the rod case to the tackle container. The rod case is hingably coupled to a rear wall of the lower peripheral wall of the tackle container. A tackle container cover is rotatably coupled to an interior surface of the rear wall of the lower peripheral wall. The tackle container cover is adapted for keeping the fishing tackle within the tackle container.

Still yet another object of the present invention is to provide a new fishing pole and tackle case that provides a way of carrying a fishing rod and fishing tackle within a single case.

Even still another object of the present invention is to provide a new fishing pole and tackle case that protects a fishing rod and tackle while they are being transported.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new fishing pole and tackle case according to the present invention.

FIG. 2 is a schematic perspective view of the present invention in an open position.

FIG. 3 is an enlarged schematic perspective view of the present invention specifically the area designated as 3 in FIG. 2.

FIG. 4 is an enlarged schematic perspective view of the prop rod of the present invention.

DESCRIPTION OF THE PREFERRED EMBODIMENT

Figure 5:
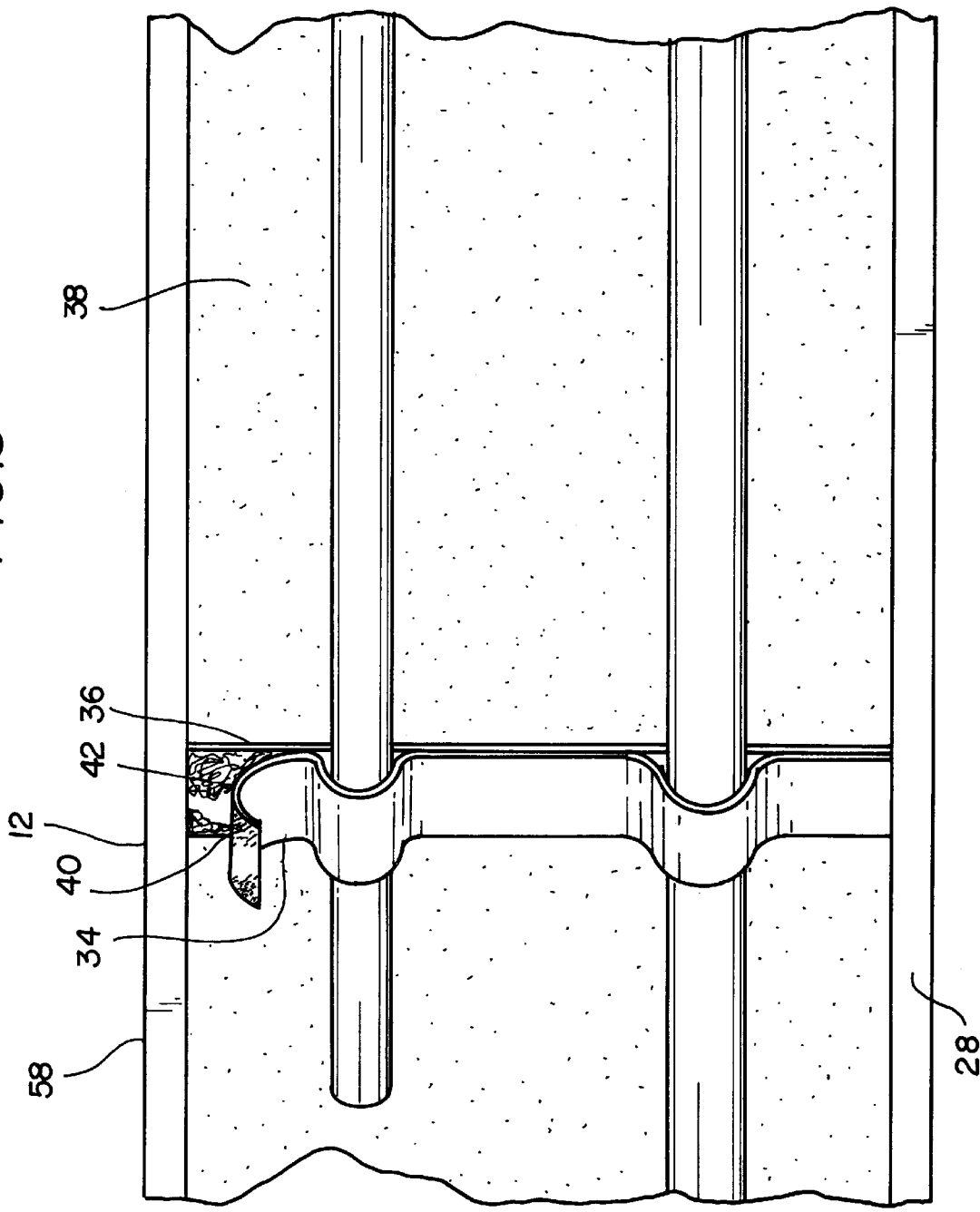
FIG. 5 is an enlarged schematic perspective view of the securing means of the present invention.

With reference now to the drawings, and in particular to FIGS. 1 through 5 thereof, a new fishing pole and tackle case embodying the principles and concepts of the present invention and generally designated by the reference numeral 10 will be described.

As best illustrated in FIGS. 1 through 5, the fishing pole and tackle case 10 generally comprises an elongate rod case 12 adapted for protecting the fishing rod therein. A reel portion 14 of the rod case extends upwardly from a top surface 16 of the rod case. An upper periphery wall 18 extends downwardly from a peripheral edge of the top surface such that an inner surface 20 of the upper periphery wall defines an upper portion of an interior space of the rod case.

A tackle container 22 is adapted for holding fishing tackle therein. The tackle container has a bottom wall 24 and a lower peripheral wall 26. The lower peripheral wall extends upward from a periphery of the bottom wall. The bottom wall and the lower peripheral wall are for defining a storage space of the tackle container. A back wall 28 of the upper periphery wall of the rod case is hingably coupled to a rear wall 30 of the lower peripheral wall of the tackle container.

As shown in FIGS. 2 and 5, a plurality of rod securing means 32 for securing the rod to the rod case such that the reel attached to the rod is disposed within the reel portion of the rod case. The interior face of the rod case comprises a shock absorbing material.

Each of the rod securing means comprise a first strap 34 and a second strap 36. The second strap is secured to an interior face 38 of the rod case. A first portion of a hook and loop fastener 40 is coupled to a first side of the first strap. A complimentary portion of the hook and loop fastener 42 is coupled to a first side of the second strap. The first strap is adapted for releasably coupling to the second strap such that the fishing rod is secured between the first strap and the second strap.

As shown in FIG. 3, a hook retainer 44 is coupled to the interior face of the rod case. The hook retainer is adapted for securing a fishing hook attached to a fishing rod stored in the rod case. The hook retainer is located proximate an end of the rod case opposite the reel portion. The hook retainer has magnetic properties for magnetically holding the hook against the hook retainer. The hook retainer has an arcuate channel 46 for securing the hook therein. A carrying handle 48 is coupled to the top surface of the rod case.

Also included, a plurality of divider walls 50 are coupled within the storage space between the lower peripheral wall and the bottom wall. The divider walls are for dividing the storage space into individual compartments.

Further included are a plurality of clasping means 52 for securing the rod case to the tackle container. Each of the clasping means comprises a clasp 54 and a clasp anchor 56. The clasp is coupled to a front portion 58 of the upper periphery wall. The clasp anchor is coupled to a front wall 60 of the lower peripheral wall.

A tackle container cover 62 is rotatably coupled to an interior surface of the rear wall of the lower peripheral wall. The tackle container cover is adapted for keeping the fishing tackle within the tackle container.

As shown in FIG. 4, a prop rod 64 is rotatably coupled within the storage space for holding the tackle container cover in an open position. The prop rod is rotatably coupled to an interior face of the front wall of the lower peripheral wall. The prop rod can have a distinctive form of a fish.

In use, a user could take his rod and reel and place them in the rod case by separating the rod into two halves. The user would then secure the rod and reel into the rod case by laying the rod over the second strap of the securing means such that the reel is within the reel portion. Then the first strap would be laid over the second strap to secure the rod between the two straps. The hook attached to the line of the rod would be placed on the hook retainer to prevent the hook from coming loose and possibly hooking on objects in the case. The tackle container would have a variety of spaces separated by the divider walls for holding a variety of equipment such as an extra reel, a knife, tackle and various other equipment. The tackle container cover would be used to prevent the items in the tackle container form scattering and getting tangled together. The user could use the prop rod to keep the tackle container cover open while obtaining objects from within the tackle container. With the tackle container cover closed the user would close the rod case over the tackle container and secure the rod case to the tackle container with the clasping means. The user could then transport the rod, reel and tackle safely from one location to another.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod and tackle carrying case for carrying a fishing rod with a reel attached and fishing hooks and tackle; the carrying case comprising:

a rod case adapted for protecting the fishing rod therein, an upper periphery wall extending downwardly from a peripheral edge of a top surface such that an inner surface of said upper periphery wall defines an upper portion of an interior space of said rod case;

a tackle container adapted for holding the fishing tackle therein, said tackle container having a bottom wall and a lower peripheral wall, said lower peripheral wall extending upward from a periphery of said bottom wall, said bottom wall and said lower peripheral wall being for defining a storage space of said tackle container;

a plurality of clasping means for securing said rod case to said tackle container, said rod case being hingably coupled to a rear wall of said lower peripheral wall of said tackle container;

a plurality of rod securing means for securing the fishing rod to said rod case such that the reel attached to the rod is disposed in a reel portion of said rod case;

a tackle container cover being coupled to an interior surface of said rear wall of said lower peripheral wall, said tackle container cover adapted for keeping the fishing tackle within said tackle containers;

a hook retainer being coupled to an interior face of said rod case, said hook retainer being adapted for securing a fishing hook attached to the rod stored in said rod case; and wherein said hook retainer has an arcuate channel for securing the hook therein.

2. The carrying case as set forth in claim 1 wherein said reel portion extends upwardly from a top surface of said rod case.

3. The carrying case as set forth in claim 1 further comprising a carrying handle being coupled to said top surface of said rod case.

4. The carrying case as set forth in claim 1 wherein each of said rod securing means comprises a first strap and a second strap, said second strap being secured to said interior face of said rod case, a first portion of a hook and loop fastener being coupled to a first side of said first strap, a complimentary portion of said hook and loop fastener being couple to a first side of said second strap.

5. The carrying case as set forth in claim 1 wherein said each of said clasping means comprises a clasp and a clasp anchor, said clasp is coupled to a front portion of said upper periphery wall, said clasp anchor is coupled to a front wall of said lower peripheral wall.

6. The carrying case as set forth in claim 1 further comprises a plurality of divider walls being coupled within said storage space between said lower peripheral wall, said divider walls being for dividing said storage space into individual compartments.

7. The carrying case as set forth in claim 1 further comprises a prop rod being rotatable within said storage space for holding said tackle container cover in an open position.

8. The carrying case as set forth in claim 7 wherein said prop rod is coupled to an interior face of a front wall of said lower peripheral wall.

9. The carrying case as set forth in claim 1 wherein said hook retainer is located proximate an end of said rod case opposite said reel portion.

10. The carrying case as set forth in claim 1 wherein said hook retainer has magnetic properties for magnetically holding the hook in place.

11. A fishing rod and tackle carrying case for carrying a fishing rod with a reel attached and fishing hooks and tackle; the carrying case comprising:

an elongate rod case adapted for protecting the fishing rod therein, a reel portion of said rod case extending upwardly from a top surface of said rod case, an upper periphery wall extending downwardly from a peripheral edge of said top surface such that an inner surface of said upper periphery wall defines an upper portion of an interior space of said rod case;

a tackle container adapted for holding the fishing tackle therein, said tackle container having a bottom wall and a lower peripheral wall, said lower peripheral wall extending upward from a periphery of said bottom wall, said bottom wall and said lower peripheral wall for defining a storage space of said tackle container;

a back wall of said upper periphery wall of said rod case being hingably coupled to a rear wall of said lower peripheral wall of said tackle container;

a plurality of rod securing means for securing the rod to said rod case such that the reel attached to the rod is disposed in a reel portion of said rod case;

each of said rod securing means comprising a first strap and a second strap, said second strap being secured to an interior face of said rod case, a first portion of a hook and loop fastener being coupled to a first side of said first strap, a complimentary portion of said hook and loop fastener being coupled to a first side of said second strap, said first strap being adapted for releasably coupling to said second strap such that the fishing rod is secured between said first strap and said second strap;

a hook retainer being coupled to said interior face of said rod case, said hook retainer being adapted for securing a fishing hook attached to the fishing rod is stored in said rod case, said hook retainer being located proximate an end of said rod case opposite said reel portion, said hook retainer having magnetic properties for magnetically holding the hook against the hook retainer, said hook retainer having an arcuate channel for securing the hook therein;

a carrying handle being coupled to said top surface of said rod case;

a plurality of divider walls being coupled within said storage space between said lower peripheral wall and said bottom wall, said divider walls being for dividing said storage space into individual compartments;

a plurality of clasping means for securing said rod case to said tackle container, each of said clasping means comprising a clasp and a clasp anchor, said clasp being coupled to a front portion of said upper periphery wall, said clasp anchor being coupled to a front wall of said lower peripheral wall;

a tackle container cover being rotatably coupled to an interior surface of said rear wall of said lower peripheral wall, said tackle container cover adapted for keeping the fishing tackle within said tackle container; and a prop rod being rotatable within said storage space for holding said tackle container cover in an open position, said prop rod being coupled to an interior face of said front wall of said lower peripheral wall.

* * * * *